United States Patent Office 3,297,669
Patented Jan. 10, 1967

3,297,669
POLYMERIZATION PROCESS USING A CATALYST OF AN ORGANOPEROXYSILANE
Alva F. Harris, Wilbraham, Mass., and George A. Mortimer, La Marque, Tex., asignors to Monsanto Company, St. Louis, Mo., a corporation of Delaware
No Drawing. Filed July 24, 1964, Ser. No. 385,061
17 Claims. (Cl. 260—880)

This application is a continuation-in-part of our copending application Ser. No. 259,386, filed February 18, 1963, now abandoned.

The invention relates to the polymerization of styrene-type monomers and more particularly relates to a novel process for mass polymerizing such monomers to form moldable products having low residual monomer contents.

It is known that styrene-type monomers can be polymerized thermally or catalytically to prepare polymers having molecular weights and residual monomer contents which vary with certain reaction parameters, e.g., the catalyst concentration, the time and temperature of the reaction, etc. It is also known that the product normally has an undesirably high residual monomer content when the parameters of a mass polymerization process are controlled so as to prepare a molding-grade polystyrene, i.e., a polystyrene having a Staudinger average molecular weight in the range of about 40,000–100,000.

As shown in U.S. Patent 2,675,362, molding-grade polystyrene having a residual monomer content as low as 0.35–0.5% can be obtained by a mass polymerization technique when an alkanoic acid containing 12–20 carbon atoms is employed as the polymerization catalyst instead of or in addition to a conventional peroxy catalyst. Although this process represents an improvement over mass polymerization processes utilizing only conventional peroxy catalysts, it has certain disadvantages, viz., (1) use of the alkanoic acid catalysts leads to discoloration of the product and (2) regardless of the concentrations in which the alkanoic acids and any conventional peroxy co-catalysts are employed, the process does not permit the formation of products having residual monomer contents lower than 0.35–0.5%. It would obviously be desirable to find a catalyst which, like the alkanoic acids, would cause a reduction in the normal residual monomer content of a molding-grade polystyrene prepared by a mass polymerization technique but which, unlike the alkanoic acids, would permit even greater reductions in residual monomer content to be obtained and would not lead to discoloration of the product.

An object of the invention is to provide a novel process for polymerizing styrene-type monomers.

Another object is to provide a mass process for polymerizing styrene-type monomers to moldable polymers containing a minimum amount of residual monomer.

These and other objects are attained by (1) dissolving in a polymerizable material comprising a monovinyl aromatic hydrocarbon and/or an ar-halo monovinyl aromatic hydrocarbon a catalytic amount of an organoperoxysilane having a half-life of about 220–30,000 hours in benzene at 100° C., optionally in conjunction with a conventional peroxy catalyst having a half-life of about 10–15,000 hours in benzene at 100° C., (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

The following examples are given to illustrate the invention and are not intended as a limitation thereof. In the reactions described in these examples (1) quantities mentioned are quantities by weight unless otherwise specified, (2) the monovinyl aromatic monomers employed as starting materials are commercially-supplied monomers containing 0.001–0.0015% t-butyl catechol and varying amounts of the impurities normally present in commercially-supplied styrene-type monomers, and (3) aliquots of the same monomer sample are polymerized in any series of reactions proposed for direct comparison of results.

EXAMPLE I

Part A.—Control

Dissolve 0.04 part of di-t-butyl peroxide in 100 parts of styrene. Purge the reaction vessel with nitrogen and heat at 90° C. for 24 hours to convert about 30% of the styrene to polymer. Then gradually raise the the reaction temperature to 190° C. over a period of 4.75 hours and maintain the temperature at 190° C. for an additional 4 hours. The product has a Staudinger average molecular weight in the range of 40,000–80,000 and a residual monomer content of 1.13%.

Part B

Prepare two products by repeating Part A except for substituting, respectively, 0.04 part and 0.08 part of t-butylperoxytrimethylsilane for the 0.04 part of di-t-butyl peroxide. The products have Staudinger average molecular weights in the range of 40,000–80,000 and respective residual monomer contents of 0.53% and 0.11%.

Part C

Prepare four products by repeating Part A except for also dissolving, respectively, 0.001 part, 0.005 part, 0.01 part, and 0.02 part of t-butylperoxytrimethylsilane in the monomer. The products have Staudinger average molecular weights in the range of 40,000–80,000 and respective residual monomer contents of 0.69%, 0.42%, 0.09% and 0.03%.

EXAMPLE II

Part A.—Control

Charge 100 parts of styrene to a suiitable reaction vessel. Purge the reaction vessel with nitrogen and heat at 90° C. for 24 hours to convert about 30% of the styrene to polymer. Then gradually raise the reaction temperature to 190° C. over a period of 4.75 hours and maintain the temperature at 190° C. for an additional 4 hours. The product has a Staudinger average molecular weight in the range of 40,000–80,000 and a residual monomer content of 1.68%.

Part B.—Control

Repeat Part A except for dissolving 0.04 part of di-t-butyl peroxide in the 100 parts of styrene prior to purging the reaction vessel. The product has a Staudinger average molecular weight in the range of 40,000–80,000 and a residual monomer content of 1.35%.

Part C

Prepare three products by repeating Part A except for dissolving, respectively, 0.02 part, 0.04 part, and 0.08 part of di(t-butylperoxy)dimethylsilane in the 100 parts of styrene prior to purging the reaction vessel. The products have Staudinger average molecular weights in the range of 40,000–80,000 and respective residual monomer contents of 0.48%, 0.13%, and 0.04%.

Part D

Prepare three products by repeating Part A except for dissolving 0.04 part of di-t-butyl peroxide and, respectively, 0.02 part, 0.04 part, and 0.08 part of di(t-butylperoxy)dimethylsilane in the 100 parts of styrene prior to purging the reaction vessel. The products have Staudinger average molecular weights in the range of 40,000–80,000 and respective residual monomer contents of 0.04%, 0.03%, and 0.02%.

EXAMPLE III

*Part A.—Control*

Dissolve 0.04 part of di-t-butyl peroxide in 100 parts of styrene. Purge the reaction vessel with nitrogen and heat at 90° C. for 24 hours to convert about 30% of the styrene to polymer. Then gradually raise the reaction temperature to 190° C. over a period of 4.75 hours and maintain the temperature at 190° C. for an additional 4 hours. The product has a Staudinger average molecular weight in the range of 40,000–80,000 and a residual monomer content of 1.37%.

*Part B*

Prepare two products by repeating Part A except for also dissolving, respectively, 0.02 part and 0.04 part of di(t-butylperoxy)diphenylsilane in the monomer. The products have Staudinger average molecular weights in the range of 40,000–80,000 and respective residual monomer contents of 0.77% and 0.26%.

As demonstrated in the preceding examples, moldable polystyrenes having lower residual monomer contents than moldable polystyrenes prepared in the presence of conventional peroxy catalysts can be prepared without the use of a discoloring alkanoic acid when an organoperoxysilane having a half-life of about 220–30,000 hours in benzene at 100° C. is employed instead of or in addition to a conventional peroxy catalyst. Similar results are observed when:

(1) The time-temperature cycle employed for the reaction is (a) 24 hours at 90° C., followed by 3.5 hours at 90–185° C., followed by 1 hour at 185° C., (b) 24 hours at 90° C., followed by 6.25 hours at 90–185° C., followed by 1.5 hours at 185° C., or (c) 12 hours at 110–90° C., followed by 4.5 hours at 90–190° C., followed by 3 hours at 190° C.

(2) The 100 parts of styrene are replaced with 100 parts of p-chlorostyrene, 100 parts of a mixture of o-, m-, and p-methylstyrenes, a mixture of 85 parts of styrene and 15 parts of acrylonitrile, a mixture of 80 parts of styrene and 20 parts of methyl methacrylate, a mixture of 75 parts of styrene and 25 parts of alpha-methylstyrene, or a solution of 10 parts of a rubbery butadiene-styrene (75:25) copolymer in 100 parts of styrene, and (3) The organoperoxysilane employed as the catalyst is tri(t-butylperoxy)methylsilane, tetra(t-butylperoxy)silane, di(t-butylperoxy)methylphenylsilane, tri(t-butylperoxy)phenylsilane, t-butylperoxytriethylsilane, di(t-butylperoxy)diethylsilane, tri(t-butylperoxy)ethylsilane, tri(t-butylperoxy)benzylsilane, tri(t-butylperoxy)naphthylsilane, tri(t-butylperoxy)cyclohexylsilane, t-amylperoxytrimethylsilane, 2-phenyl-2-propylperoxytrimethylsilane, or p-menthylperoxytrimethylsilane.

The organoperoxysilane employed in the practice of the invention can be any monomer-soluble organoperoxysilane having a half-life of about 220–30,000 hours in benzene at 100° C., but the organoperoxysilanes having half-lives in benzene at 100° C. of about 500–30,000 hours, particularly 8000–28,000 hours, are preferred. Organoperoxysilanes having half-lives substantially shorter than about 220 hours in benzene at 100° C. are not useful in the practice of the invention, because they are completely or substantially completely consumed before the reaction reaches the finishing stage, i.e., the stage conducted at 180–200° C., when the presence of a catalyst is required in order to reduce residual monomer content. Organoperoxysilanes having half-lives longer than about 30,000 hours in benzene at 100° C. are at least less efficient than the organoperoxysilanes of the invention and are completely ineffective when they are too stable to decompose at temperatures of 180–200° C.

Although trimethylsilylperoxytrimethylsilane and other organoperoxysilanes containing more than one silicon atom and having suitable half-lives can be employed in the practice of the invention, the preferred organoperoxysilanes are compounds coresponding to the formula:

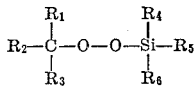

wherein $R_1$, $R_2$, and $R_3$ are independently selected from the group consisting of alkyl, cycloalkyl, aryl, and aralkyl radicals and $R_4$, $R_5$, and $R_6$ are independently selected from the group consisting of alkyl, cycloalkyl, aryl, and aralkyl radicals and a radical corresponding to the formula:

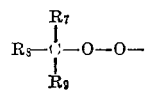

wherein $R_7$, $R_8$, and $R_9$ are independently selected from the group consisting of alkyl, cycloalkyl, aryl, and aralkyl radicals. Exemplary of the alkyl, cycloalkyl, aryl, and aralkyl radicals which can be present in these compounds are methyl, ethyl, propyl, butyl, pentyl, hexyl, cyclobutyl, cyclopentyl, cyclohexyl, menthyl, phenyl, tolyl, naphthyl, benzyl, etc. The preferred compounds are those in which the alkyl and cycloalkyl radicals contain up to 6 carbon atoms and the aryl and aralkyl radicals contain up to 12 carbon atoms.

Such compounds, when not commercially available can be prepared by reacting a suitable halosilane (e.g., diethyldifluorosilane, ethyltrifluorosilane, tetrafluorosilane, trimethylchlorosilane, triphenylchlorosilane, ditolyldichlorosilane, naphthyltrifluorosilane, dicyclohexyldichlorosilane, benzyltrichlorosilane, ethylisobutylbenzylchlorosilane, etc.) with a suitable organic hydroperoxide or mixture of organic hydroperoxides in the presence of a hydrogen halide acceptor such as ammonia or an amine in a solvent such as ether, etc., essentially in accordance with the equation:

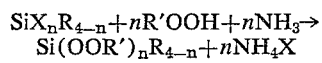

wherein X represents a halogen (i.e., F, Cl, Br, or I), R and R′ represent alkyl, cycloalkyl, aryl, or aralkyl radicals, and $n$ is an integer of 1–4.

Exemplary of the organoperoxysilanes which can be employed in the practice of the invention are t-butylperoxytrimethylsilane,
di(t-butylperoxy)dimethylsilane,
tri(t-butylperoxy)methylsilane,
tetra(t-butylperoxy)silane,
di(t-butylperoxy)methylphenylsilane,
di(t-butylperoxy)diphenylsilane,
tri(t-butylperoxy)phenylsilane,
t-butylperoxytriethylsilane,
di(t-butylperoxy)diethylsilane,
tri(t-butylperoxy)ethylsilane,
tri(t-butylperoxy)benzylsilane,
tri(t-butylperoxy)naphthylsilane,
tri(t-butylperoxy)cyclohexylsilane,
t-amylperoxytrimethylsilane,
2-phenyl-2-propylperoxytrimethylsilane,
p-menthylperoxytrimethylsilane,
etc., and mixtures thereof.

The amount of organoperoxysilane employed varies with the particular product desired but is ordinarily in the range of about 0.001–0.1%, based on the weight of the polymerizable material. The lower concentrations of silane, e.g., about 0.001–0.04%, are usually employed when a co-catalyst is used; the higher concentrations of silane, e.g., about 0.04–0.1%, are usually employed when no co-catalyst is used.

The optional component of the catalyst can be any monomer-soluble peroxy compound having a half-life of 10–15,000 hours in benzene at 100° C. Utilizable peroxy compounds include, e.g., hydrogen peroxide, di-t-butyl diperphthalate, t-butyl peracetate, t-butyl perbenzoate, dicumyl peroxide, di-t-butyl peroxide, t-butylperoxyisopropyl carbonate, 2,5-dimethyl, 2,5-di(t-butylperoxy)hexane, 2,5-di-methyl-2,5-di(t-butylperoxy)hexyne-3, t-butyl hydroperoxide, cumene hydroperoxide, p-menthane hydroperoxide, cyclopentane hydroperoxide, diisopropylbenzene hydroperoxide, p-t-butyl-cumene hydroperoxide, pinane hydroperoxide, 2,5-dimethylhexane-2,5-dihydroperoxide, etc., and mixtures thereof.

Use of this optional component is frequently found to be desirable because of the catalytic effectiveness of such peroxy compounds at the temperatures employed prior to the finishing stage of the reaction, i.e., at temperatures of 75–180° C. When included as a catalyst component, the optional peroxy compound is usually employed in concentrations of 0.01–0.1%, preferably 0.01–0.05%, based on the weight of the polymerizable material.

The catalyst of the invention is used in the polymerization of polymerizable materials comprising a monovinyl aromatic hydrocarbon and/or an ar-halo monovinyl aromatic hydrocarbon, e.g., styrene; vinyl naphthalene; ar-alkylstyrenes, such as o-, m-, and p-methylstyrenes, ar-ethylstyrenes, p-t-butylstyrene, etc.; ar-halostyrenes, such as o-chlorostyrene, p-bromostyrene, 2-chloro-4-methylstyrene, etc.; and mixtures thereof. The monovinyl aromatic monomer may constitute the only component of the polymerizable material or may be in admixture with one or more copolymerizable monomers, such as acrylonitrile; methacrylonitrile; an alkyl methacrylate, e.g., the methyl, ethyl, propyl, and butyl methacrylates; the corresponding alkyl acrylates; alpha-alkylstyrenes, e.g., alpha-methylstyrene, alpha-ethylstyrene, alpha-methyl-p-methylstyrene, etc. Ordinarily, the monovinyl aromatic monomer constitutes at least 50% by weight of the polymerizable material.

When desired, the polymerizable material can have a rubbery conjugated 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in concentrations of 1–25%, based on the weight of polymerizable material. Also, the reaction mixture can contain other optional ingredients, e.g., plasticizers, stabilizers, lubricants such as mineral oils, fatty acids, fatty acid esters, fatty alcohols, and other conventional lubricating additives, etc.

In order to form moldable polymers having a minimum residual monomer content by mass polymerizing styrene-type monomers in the presence of the organoperoxysilanes, a fairly specific time-temperature cycle is utilized. In the first stage of the reaction, polymerization is conducted at 75–125° C. for about 6–24 hours until 15–45% of the monomer has been converted to polymer; in the second stage, the reaction temperature is gradually raised from 75–95° C. to 180–200° C. over a period of about 3–7 hours; in the final stage, the reaction temperature is maintained at 180–200° C. for about 0.5–5 hours.

The manner of manipulating the reaction temperature during the first stage of the reaction in order to be in the 75–95° C. range for the beginning of the second stage of the reaction is not critical, e.g., an initial temperature of about 100–125° C. can be gradually lowered to 75–95° C. during the first stage of the reaction or the temperature can be maintained at 75–95° C. throughout the first stage of the reaction, etc. According to a preferred embodiment of the invention, the reaction mixture is initially heated to 105–115° C. and maintained at a temperature gradually lowered to about 90° C. until about 25–45% conversion to polymer is obtained, after which the temperature is gradually raised to 180–200° C. over a period of about 3–7 hours and then maintained at 180–200° C. for about 2–5 hours to complete the reaction. Especially good results are also obtained by initially heating the reaction mixture at 90° C. to about 25–35% conversion, then heating at a temperature gradually raised to 180–200° C. over a period of about 4–5 hours, and finally heating at 180–200° C. for 2–4 hours.

The present invention is particularly advantageous in that it permits the formation by a mass process of moldable polystyrene-type materials having residual monomer contents as low or even lower than the residual monomer contents of comparable polymers obtained by the use of alkanoic acid catalysts. The products have better color than the polymers prepared in the presence of alkanoic acids, and the reduced residual monomer content improves their physical and molding properties.

It is obvious that many variations can be made in the products and processes set forth above without departing from the spirit and scope of this invention.

What is claimed is:

1. A mass polymerization process which comprises (1) dissolving in a polymerizable material comprising at least a major proportion of a monovinyl aromatic monomer of the group consisting of a monovinyl aromatic hydrocarbon, an ar-halo monovinyl aromatic hydrocarbon, and mixtures thereof a catalytic amount of an organoperoxysilane having a half-life of about 220–30,000 hours in benzene at 100° C., said organoperoxysilane corresponding to the formula:

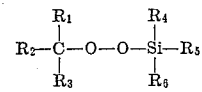

wherein $R_1$, $R_2$, and $R_3$ are independently selected from the group consisting of alkyl, cycloalkyl, aryl, and aralkyl radicals and $R_4$, $R_5$ and $R_6$ are independently selected from the group consisting of alkyl, cycloalkyl, aryl and aralkyl radicals and a radical corresponding to the formula:

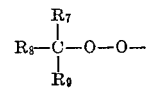

wherein $R_7$, $R_8$ and $R_9$ are independently selected from the group consisting of alkyl, cycloalkyl, aryl and aralkyl radicals, (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

2. The process of claim 1 wherein the organoperoxysilane is a compound having a half-life of about 500–30,000 hours in benzene at 100° C.

3. A mass polymerization process which comprises (1) dissolving in a polymerizable material comprising at least a major proportion of a monovinyl aromatic monomer of the group consisting of a monovinyl aromatic hydrocarbon, an ar-halo monovinyl aromatic hydrocarbon, and mixtures thereof a catalytic amount of an organoperoxysilane having a half-life of about 8000–28,000 hours in benzene at 100° C. and corresponding to the formula:

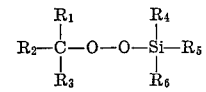

wherein $R_1$, $R_2$, and $R_3$ are independently selected from the group consisting of alkyl, cycloalkyl, aryl, and aralkyl radicals and $R_4$, $R_5$, and $R_6$ are independently selected from the group consisting of alkyl, cycloalkyl, aryl, and aralkyl radicals and a radical corresponding to the formula:

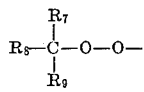

wherein $R_7$, $R_8$, and $R_9$ are independently selected from the group consisting of alkyl, cycloalkyl, aryl, and aralkyl radicals, (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

4. The process of claim 3 wherein the polymerizable material is styrene.

5. The process of claim 3 wherein the polymerizable material is a mixture of styrene and alphamethylstyrene.

6. The process of claim 3 wherein the polymerizable material is a mixture of styrene and acrylonitrile.

7. The process of claim 3 wherein the polymerizable material contains a dissolved rubbery conjugated 1,3-diene polymer.

8. The process of claim 3 wherein the organoperoxysilane is t-butylperoxytrimethylsilane.

9. The process of claim 3 wherein the organoperoxysilane is di(t-butylperoxy)dimethylsilane.

10. The process of claim 3 wherein the organoperoxysilane is tri(t-butylperoxy)methylsilane.

11. The process of claim 3 wherein the organoperoxysilane is tetra(t-butylperoxy)silane.

12. The process of claim 3 wherein the organoperoxysilane is di(t-butylperoxy)methylphenylsilane.

13. The process of claim 3 wherein the organoperoxysilane is tri(t-butylperoxy)phenylsilane.

14. The process of claim 3 wherein about 0.001–0.1 part by weight of the organoperoxysilane is dissolved in 100 parts by weight of the polymerizable material.

15. The process of claim 3 wherein about 0.001–0.04 part by weight of the organoperoxysilane and about 0.01–0.1 part by weight of a peroxy compound of the group consisting of hydrogen peroxide and an organic peroxy compound having a half-life of 10–15,000 hours in benzene at 100° C. are dissolved in 100 parts by weight of the polymerizable material.

16. A mass polymerization process which comprises (1) dissolving about 0.001–0.1 part by weight of t-butylperoxytrimethylsilane and 0–0.1 part by weight of di-t-butylperoxide in 100 parts by weight of styrene, (2) heating the styrene to 105–115° C. and then gradually lowering the temperature to about 90° C. to obtain 25–45% conversion to polymer, (3) gradually raising the temperature to 180–200° C. over a period of about 3–7 hours, and (4) maintaining the reaction temperature at 180–200° C. for 2–5 hours.

17. A mass polymerization process which comprises (1) dissolving about 0.001–0.1 part by weight of di(t-butylperoxy)dimethylsilane and 0–0.1 part by weight of di-t-butyl peroxide in 100 parts by weight of styrene, (2) heating the styrene to 105–115° C. and then gradually lowering the temperature to about 90° C. to obtain 25–45% conversion to polymer, (3) gradually raising the temperature to 180–200° C. over a period of about 3–7 hours, and (4) maintaining the reaction temperature at 180–200° C. for 2–5 hours.

References Cited by the Examiner

UNITED STATES PATENTS

| | | | |
|---|---|---|---|
| 2,675,362 | 4/1954 | Shusman | 260—23 |
| 2,886,553 | 5/1959 | Stein et al. | 260—93.5 |
| 2,997,497 | 8/1961 | Jenkner | 260—448.8 |
| 3,196,136 | 7/1965 | Boutsicaris | 260—86.7 |
| 3,196,138 | 7/1965 | Best | 260—88.2 |
| 3,214,493 | 10/1965 | Harris | 260—85.5 |

JOSEPH L. SCHOFER, *Primary Examiner.*

H. WONG, *Assistant Examiner.*